United States Patent
Beuting et al.

(10) Patent No.: US 11,427,275 B2
(45) Date of Patent: Aug. 30, 2022

(54) ADJUSTABLE SEAT ASSEMBLY FOR A MOTORCYCLE, AND MOTORCYCLE

(71) Applicant: Bayerische Motoren Werke Aktiengesellschaft, Munich (DE)

(72) Inventors: Guido Beuting, Munich (DE); Helmut Diehl, Kochel (DE); Miroslav Nikolic, Munich (DE); Raimund Schell, Oberschleissheim (DE); Joerg Seiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/294,211

(22) PCT Filed: Nov. 4, 2019

(86) PCT No.: PCT/EP2019/080023
§ 371 (c)(1),
(2) Date: May 14, 2021

(87) PCT Pub. No.: WO2020/120026
PCT Pub. Date: Jun. 18, 2020

(65) Prior Publication Data
US 2022/0009576 A1  Jan. 13, 2022

(30) Foreign Application Priority Data
Dec. 14, 2018 (DE) .................... 10 2018 132 229.1

(51) Int. Cl.
*B62J 1/10*  (2006.01)
*B62J 1/00*  (2006.01)
(Continued)

(52) U.S. Cl.
CPC .............. *B62J 1/10* (2013.01); *B62J 1/005* (2013.01); *B62J 1/007* (2013.01); *B62J 1/02* (2013.01); *B62J 1/20* (2013.01)

(58) Field of Classification Search
CPC ..... B62J 1/10; B62J 1/005; B62J 1/007; B62J 1/02; B62J 1/20
See application file for complete search history.

(56) References Cited

U.S. PATENT DOCUMENTS

| 629,956 A | * | 8/1899 | Craig | ................. B62J 1/005 297/201 |
| 4,673,212 A | * | 6/1987 | Mayer | ................. B62J 1/00 297/195.12 |

(Continued)

FOREIGN PATENT DOCUMENTS

| CN | 2523668 Y | 12/2002 |
| CN | 102582721 A | 7/2012 |

(Continued)

OTHER PUBLICATIONS

International Search Report (PCT/ISA/210) issued in PCT Application No. PCT/EP2019/080023 dated Jan. 30, 2020 with English translation (five (5) pages).

(Continued)

*Primary Examiner* — Philip F Gabler
(74) *Attorney, Agent, or Firm* — Crowell & Moring LLP (57) ABSTRACT

An adjustable seat assembly for a motorcycle has a seat pan and an adjustment mechanism. The seat pan includes a base portion and two pivoting portions that are pivotally connected to the base portion and are arranged laterally adjacent to one another on the base portion. The base portion has a fastening portion for fastening the seat assembly on the motorcycle. The adjustment mechanism is designed to pivot each of the two pivoting portions in relation to the base (Continued)

portion to adjust a lateral width of the seat assembly. A motorcycle with an adjustable seat assembly is also provided.

13 Claims, 4 Drawing Sheets

(51) Int. Cl.
 *B62J 1/02* (2006.01)
 *B62J 1/20* (2006.01)

(56) References Cited

U.S. PATENT DOCUMENTS

| | | | | |
|---|---|---|---|---|
| 4,804,221 | A * | 2/1989 | Saiki | B62J 1/10 |
| | | | | 297/464 |
| 5,123,698 | A * | 6/1992 | Hodges | B62J 1/005 |
| | | | | 297/215.16 |
| 6,290,291 | B1 | 9/2001 | Kojima | |
| 6,402,236 | B1 * | 6/2002 | Yates | B62J 1/10 |
| | | | | 297/201 |
| 6,481,792 | B1 | 11/2002 | Goin | |
| 10,118,658 | B2 * | 11/2018 | Petty | B62J 1/08 |
| 10,750,872 | B2 * | 8/2020 | Petty | B62J 1/007 |
| 2007/0108808 | A1 | 5/2007 | Chuang | |
| 2008/0309130 | A1 * | 12/2008 | Livne | B62J 1/08 |
| | | | | 297/215.1 |
| 2014/0070593 | A1 | 3/2014 | Hughes et al. | |
| 2015/0274051 | A1 | 10/2015 | Mueller | |
| 2016/0185261 | A1 | 6/2016 | Hammann et al. | |
| 2016/0325799 | A1 * | 11/2016 | Ogawa | B62J 1/005 |
| 2017/0274950 | A1 | 9/2017 | Holt et al. | |
| 2018/0186420 | A1 | 7/2018 | Yu | |

FOREIGN PATENT DOCUMENTS

| | | |
|---|---|---|
| CN | 204264341 U | 4/2015 |
| CN | 104853953 A | 8/2015 |
| CN | 104853956 A | 8/2015 |
| CN | 204937317 U | 1/2016 |
| CN | 106347533 A | 1/2017 |
| CN | 108248730 A | 7/2018 |
| CN | 108349559 A | 7/2018 |
| DE | 197 34 742 A1 | 2/1999 |
| DE | 10 2010 005 221 A1 | 7/2011 |
| JP | 62-244768 A | 10/1987 |
| JP | 2-296584 A | 12/1990 |
| JP | 2005-125860 A | 5/2005 |
| KR | 10-2016-0017940 A | 2/2016 |
| TW | 1527725 B | 4/2016 |

OTHER PUBLICATIONS

German-language Written Opinion (PCT/ISA/237) issued in PCT Application No. PCT/EP2019/080023 dated Jan. 30, 2020 (three (3) pages).

German-language Search Report issued in German Application No. 10 2018 132 229.1 dated Aug. 8, 2019 with partial English translation (12 pages).

Chinese-language Office Action issued in Chinese Application No. 201980076364.9 dated Jan. 6, 2022 (nine (9) pages).

Chinese-language Office Action Issued in Chinese Application No. 201980076364.9 dated May 11, 2022 with English translation (13 pages).

* cited by examiner

ADJUSTABLE SEAT ASSEMBLY FOR A MOTORCYCLE, AND MOTORCYCLE

BACKGROUND AND SUMMARY OF THE INVENTION

The invention relates to an adjustable seat assembly for a motorcycle, and to a motorcycle.

On motorcycles, the seat bench forms one of the direct attachment points between man and machine, and therefore plays an important role with regard to comfort.

Various shapes of the seat bench are thus more suitable, depending on the type of motorcycle and depending on the riding style. For dynamic riding styles, for example, relatively narrow seat benches are advantageous which, however, can become uncomfortable in turn in the case of a relatively long, relatively straight ride.

A solution which is known from the prior art to this problem consists in providing a plurality of seat benches with widths which are different than one another, and to mount the respective appropriate seat bench on the motorcycle depending on the type of planned ride.

The additional seat bench or the additional seat benches is/are associated with additional costs for the customer, however, and changing them is relatively time-consuming. Moreover, the seat bench cannot be swapped simply en route, since a complete replacement seat bench has to be carried along for this purpose.

It is therefore an object of the invention to provide a motorcycle with a seat assembly, in the case of which the disadvantages from the prior art are eliminated.

According to the invention, the object is achieved by way of an adjustable seat assembly for a motorcycle, with a seat pan and an adjusting device, the seat pan comprising a base section and two pivoting sections which are connected pivotably to the base section and are arranged on the base section next to one another as viewed in the longitudinal direction of the seat assembly, the base section having a fastening section for fastening the seat assembly to the motorcycle, and the adjusting device being configured to pivot the two pivoting sections in each case with respect to the base section.

Here, the longitudinal direction of the seat assembly is to be understood to mean that direction which corresponds to the longitudinal direction of the motorcycle after mounting of the seat assembly on the motorcycle.

A width of the seat assembly can be adapted in a simple way by virtue of the fact that the two pivoting sections are pivoted away from one another by means of the adjusting device. In other words, the seat assembly according to the invention can be adjusted in terms of its width on account of the pivoting capability of the two pivoting sections. In this way, the necessity for additional seat benches for adjusting the width of the seat assembly is dispensed with, as a result of which costs are saved. In addition, the width of the seat assembly can also be adapted en route.

The pivoting sections are preferably connected in each case at their front, laterally outer end, as viewed in the longitudinal direction of the seat assembly, to the base section, in particular by means of a pivot pin. The pivoting movement of the two pivoting sections therefore take place, as viewed in the longitudinal direction of the seat assembly, laterally outward away from one another or toward one another. Therefore, the pivoting movement of the two pivoting sections brings about a pure width adjustment of the seat assembly.

One aspect of the invention provides that the adjusting device comprises a locking device which is configured to release and/or to lock a pivoting movement of the two pivoting sections, the locking device fixing, in particular, a minimum and/or a maximum angle of the pivoting movement. Here, the seat assembly has a minimum width in the case of the minimum angle of the pivoting movement and a maximum width in the case of the maximum angle of the pivoting movement. An unintentional adjustment of the seat assembly, in particular during riding with the motorcycle, is prevented reliably by way of the locking device.

In accordance with one refinement of the invention, the base section has at least two receptacles, and the pivoting sections have in each case at least one through opening, fastening means of the locking device extending through the at least one through opening of each pivoting section into in each case one of the receptacles. A non-positive and/or positively locking connection is preferably produced in each case between the pivoting sections and the base section by way of the fastening means. The fastening means are, for example, screws, bolts or other suitable fastening means.

The fastening means are preferably configured as screws. Further preferably, the receptacles have an internal thread which matches the thread of the screws, with the result that the pivoting sections can be screwed fixedly to the base section through the through openings.

A plurality of through openings can be provided in each of the pivoting sections, the plurality of through openings then being offset laterally with respect to one another, as viewed in the longitudinal direction of the seat assembly, more precisely along a circular section about the respective pivot pin of the corresponding pivoting section. As a result, the pivoting sections can be connected, in particular in a non-positive and/or positively locking manner as described above, to the base section by means of the fastening means in a stepped manner in a plurality of positions which have different pivoting angles than one another with respect to the base section. Accordingly, the width of the seat assembly can be adjusted in a plurality of steps.

The through openings are preferably configured in each case as a slot, the slots extending in the pivoting sections in each case substantially along a circular section about a center of the pivoting movement. Here, the fastening means extend through the slots into the respective receptacle in the base section. The fastening means preferably have a first and a second position, the respective pivoting section being connected in a non-positive manner to the base section with regard to the pivoting movement in a first position, and it being possible for the respective pivoting section to be pivoted with respect to the base section in the second position of the fastening means. Accordingly, the width of the seat assembly can be adjusted in an infinitely variable manner in this refinement of the invention.

Further preferably, the fastening means extend through the respective slot even in their second position, the slots in each case forming a slotted guide for the pivoting movement of the pivoting sections.

In particular, the fastening means are configured as screws. If the screws are tightened, the pivoting sections are connected in a non-positive manner to the base section with regard to the pivoting movement, and cannot be pivoted. If, in contrast, the screws are loosened, the pivoting sections can be pivoted with respect to the base section.

A further aspect of the invention provides that the adjusting device can be actuated electrically and/or mechanically. Accordingly, the adjusting device comprises an electric motor and/or a mechanical mechanism, by means of which the two pivoting sections can be pivoted. The width adjustment can take place at least partially in an automatic and/or manual manner.

Here, the adjusting device can preferably be actuated, without it being necessary for parts such as, for example, a seat cushion to be removed from the seat assembly. For this purpose, the adjusting device can have an actuating element which is accessible from outside the motorcycle, such as, for example, an adjusting wheel for actuating the mechanical mechanism and/or an actuating switch for the electric motor.

In particular, the pivoting sections have in each case one lateral wall section which, as viewed in the longitudinal direction of the seat assembly, extends laterally past the base section starting from an upper side of the base section, a contour of the wall sections, in particular, being similar at least in sections to a contour of the base section.

Here, "similar" is to be understood to mean a similarity in the mathematical sense. In particular, the contour of the wall sections is in sections substantially identical to the contour of the base section, with the result that the wall sections bear in sections on the outer side against the base section in their non-pivoted position, in particular along the entire contour of the wall sections. The wall sections than form a stop which fixes the minimum deflection of the pivoting sections with regard to the pivoting movement.

The seat assembly can have a seat cushion which extends substantially over the entire base section and is connected to the pivoting sections and/or the base section. In other words, the pivoting sections and the base section are assigned a common seat cushion.

A material, from which the seat cushion consists, can be flexible, in order to compensate for the pivoting movement of the pivoting sections.

The seat cushion preferably has a longitudinal slot in the region of the two pivoting sections, which slot preferably extends substantially over the entire length of the pivoting sections. As a result, the pivoting sections can be pivoted, without it being necessary for the material of the seat cushion to stretch substantially.

Further preferably, the seat cushion has a seat cushion cover which extends over the entire seat cushion, in particular therefore also over the longitudinal slot. As a result, it is reliably prevented that rainwater and/or dirt penetrate/penetrates into the longitudinal slot.

In particular, the seat cushion and/or the base section are/is removable. This is particularly advantageous when the adjusting device is provided below the seat cushion and/or below the base section.

Moreover, the object is achieved according to the invention by way of a motorcycle with a seat assembly according to one of the preceding claims, the base section being connected fixedly to the motorcycle. Reference is made to the above explanations with regard to the advantages.

The base section can be attached to the motorcycle such that it cannot be moved with respect to the motorcycle. As an alternative, however, the base section can be capable of having its height and/or inclination adjusted with respect to the motorcycle. Here, the height and/or inclination adjustment of the base section can take place by way of any desired, suitable mechanism which is known from the prior art.

The connection between the base section and the motorcycle can preferably be released without destruction. The base section can then therefore be removed from the motorcycle without damaging the base section or the motorcycle.

Further advantages and properties of the invention result from the following description and the appended drawings.

DETAILED DESCRIPTION OF THE DRAWINGS

Figure 1:
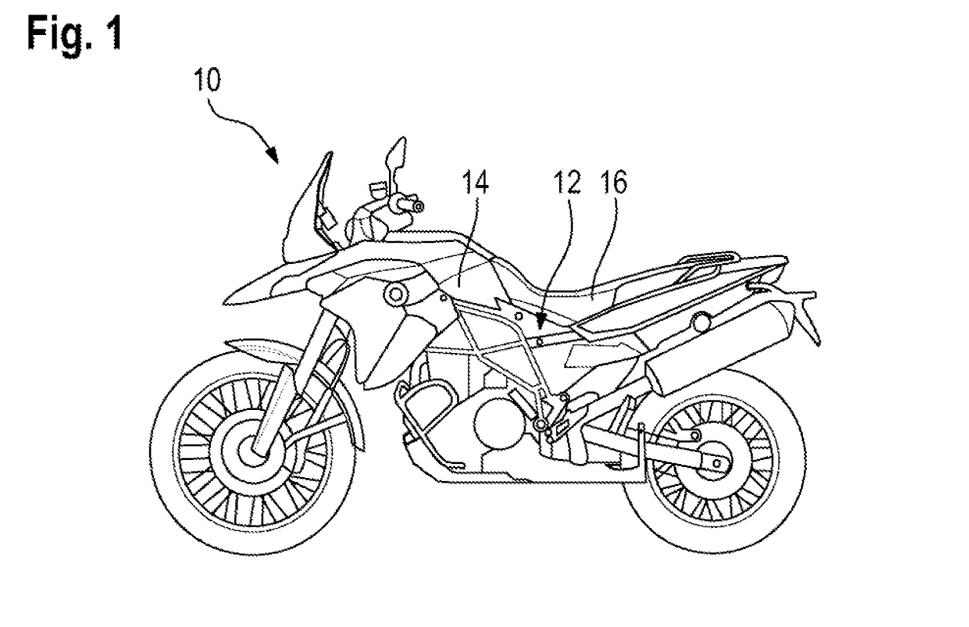
FIG. 1 shows a side view of a motorcycle according to an embodiment of the present invention.

FIG. 1 shows a motorcycle 10 which is configured as a motorbike. The motorcycle has a body 12, a tank 14 and an adjustable seat assembly 16 which is attached to the motorcycle 10 behind the tank 14 in relation to a longitudinal direction of the motorcycle 10.

As an alternative to this, the tank 14 can also be provided, however, at another location of the motorcycle 10, for example in the region of the rear of the motorcycle 10 or below the seat assembly 16.

Figure 2:
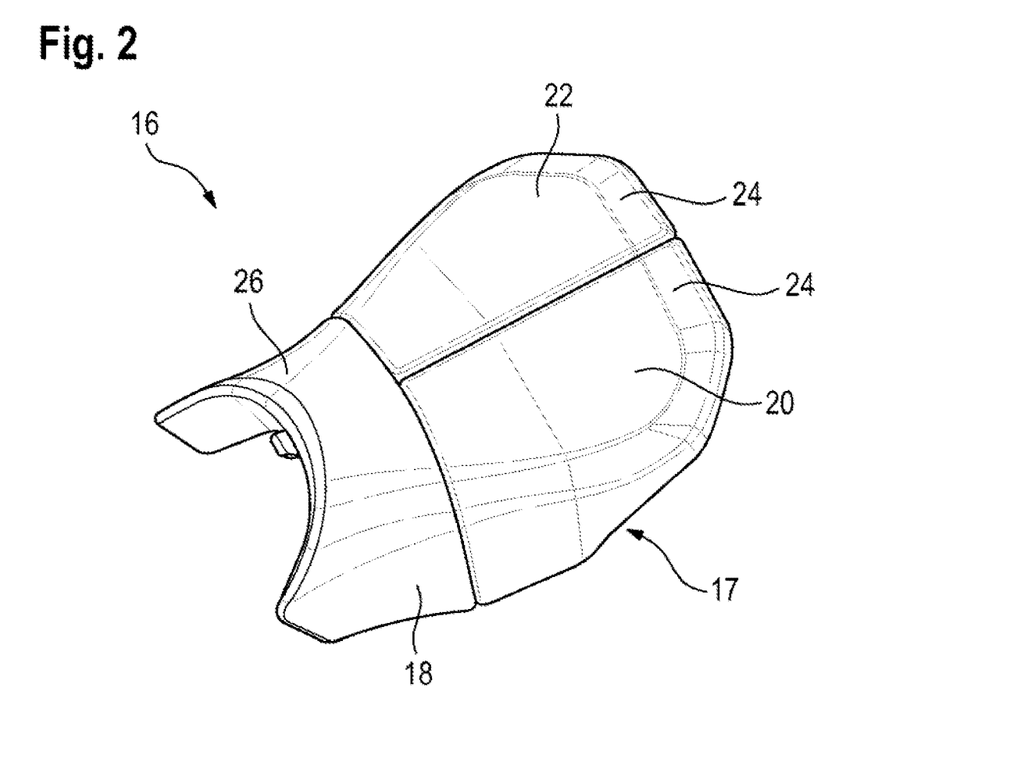
FIG. 2 shows a diagrammatic oblique view of a seat assembly of FIG. 1 in a first position.

FIG. 2 shows the seat assembly 16 in an oblique view. The seat assembly 16 comprises a seat pan 17 with a base section 18, a first pivoting section 20 and a second pivoting section 22.

Furthermore, the seat assembly 16 comprises a seat cushion 24 which is covered with a seat cushion cover 26. The seat cushion 24 forms a seat face for a rider of the motorcycle 10 and possibly for a pillion passenger. For illustrative reasons, the seat cushion 24 is not shown completely in FIGS. 2 and 3, but rather is merely indicated. In contrast, FIGS. 4 to 6 do not show the seat cushion 24 at all for illustrative reasons. The seat cushion 24 extends, however, over the entire region of the seat pan 17, that is to say over the base section 18 and the pivoting sections 20, 22.

Moreover, the seat assembly 16 has an adjusting device 28, the method of operation of which will be explained in greater detail in the following text.

Figure 3:
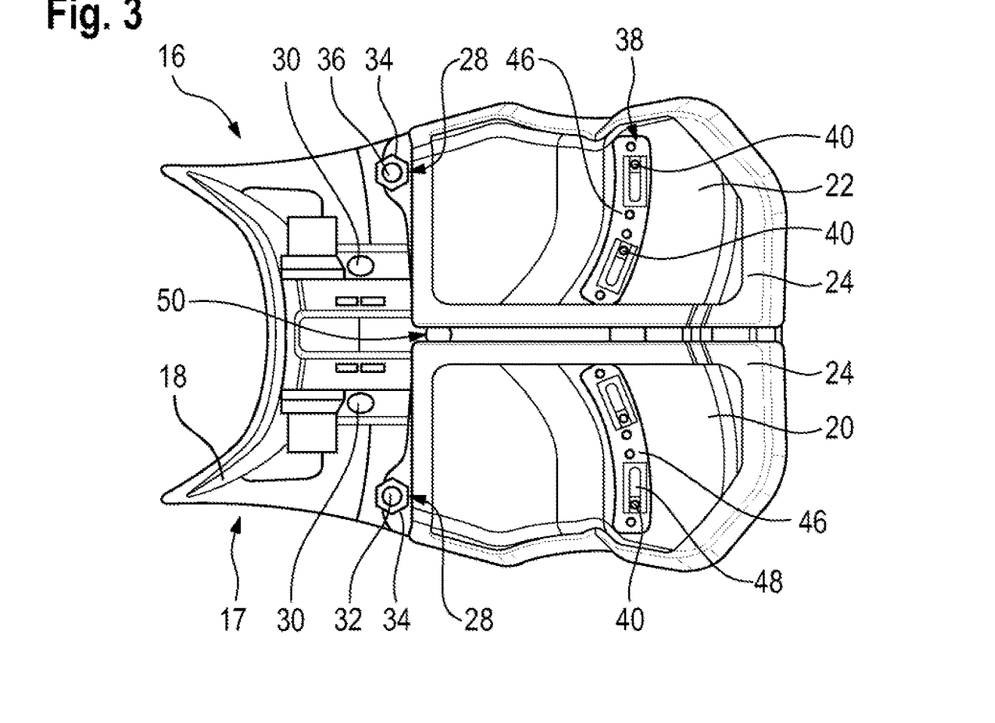
FIG. 3 shows a diagrammatic plan view of the seat assembly from FIG. 2 in a first position.

As shown in FIG. 3, the base section 18 has at least one fastening section 30, by means of which the base section 18 is connected fixedly to the body 12 and/or to a frame part of the motorcycle 10. In particular, the base section 18 is fastened, for example is screwed fixedly, to the body 12 by means of suitable fastening means.

The connection between the base section 18 and the motorcycle 10 can be released without destruction. The base section 18 can then therefore be removed from the motorcycle 10 without damaging the base section 18 or the motorcycle 10.

The first pivoting section 20 and the second pivoting section 22 are arranged on the base section 18 next to one another, as viewed in the longitudinal direction of the motorcycle 10. More precisely, the two pivoting sections 20, 22 are connected to the base section 18 such that they can be pivoted with respect to the base section 18 by means of the adjusting device 28.

For this purpose, the adjusting device 28 has a first pivot pin 32 which is attached to the base section 18 at a front, laterally outer end of the first pivoting section 20, and which extends substantially vertically. At its front, laterally outer end, the first pivoting section 20 has a connecting element 34 which is connected to the first pivot pin 32, it being possible for the first pivoting section 20 and the first pivot pin 32 to be rotated relative to one another. Via the connecting element 34 and the first pivot pin 32, the first pivoting section 20 is therefore connected to the base section 18 such that it can be pivoted with respect to the base section 18.

In particular, the connecting element has a through opening, the first pivot pin 32 extending at least partially into the through opening, for example completely through the through opening.

In an analogous manner with respect thereto, the adjusting device 28 has a second pivot pin 36 which is attached to the base section 18 at the front, laterally outer end of the second pivoting section 22, and which extends substantially vertically. At its front, laterally outer end, the second pivoting section 22 likewise has a connecting element 34 which is connected to the second pivot pin 36, it being possible for the second pivoting section 22 and the second pivot pin 36 to be rotated relative to one another. Via the connecting element 34 and the second pivot pin 36, the second pivoting section 22 is therefore connected to the base section 18 such that it can be pivoted with respect to the base section 18.

In particular, the connecting element 34 has a through opening, the second pivot pin 36 extending at least partially into the through opening, for example completely through the through opening.

By means of the adjusting device 28, the two pivoting sections 20, 22 are therefore attached to the base section 18 such that they can be pivoted with respect to the base section 18, the pivoting movement of the pivoting sections 20, 22 taking place laterally to the outside and/or to the inside, that is to say away from one another or toward one another.

In order to release and/or to lock a pivoting movement of the two pivoting sections 20, 22, the adjusting device 28 has a locking device 38 with fastening means 40.

Figure 4:
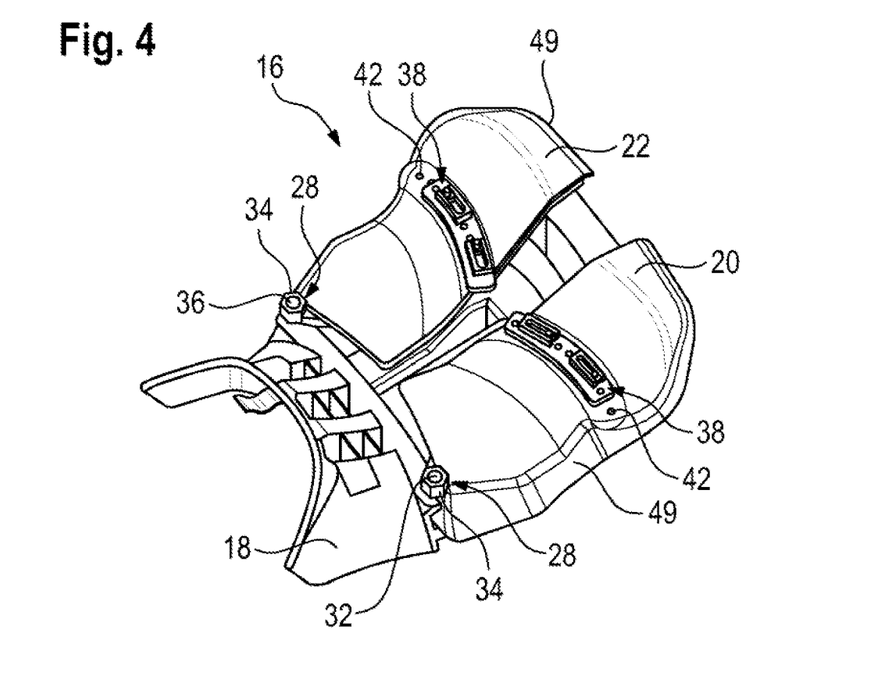
FIG. 4 shows a diagrammatic oblique view of the seat assembly from FIG. 2 in a second position.
Figure 5:
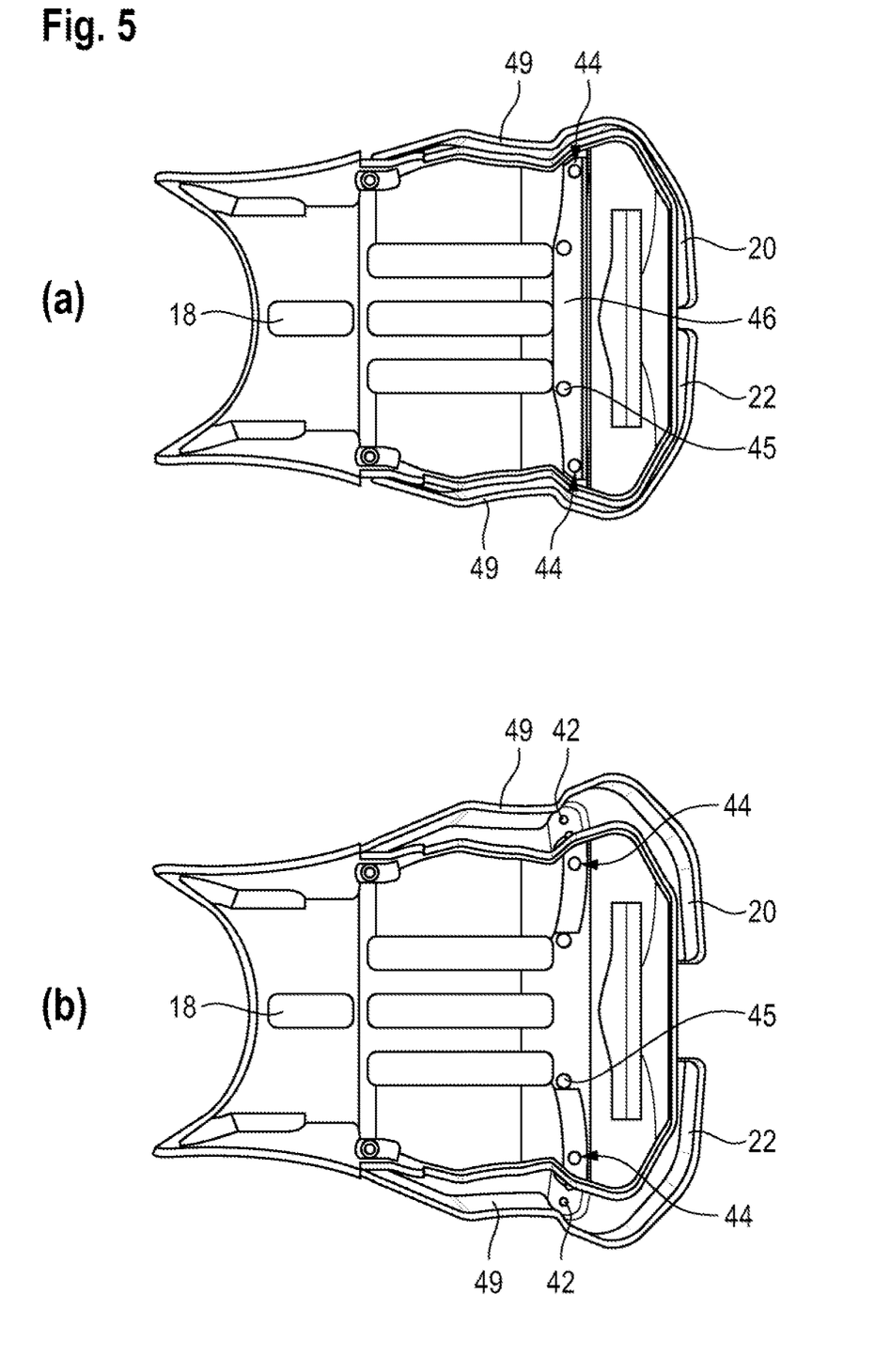
FIGS. 5a and 5b show a diagrammatic view from below of the seat assembly from FIG. 2 in the first position and in the second position, respectively.
Figure 6:
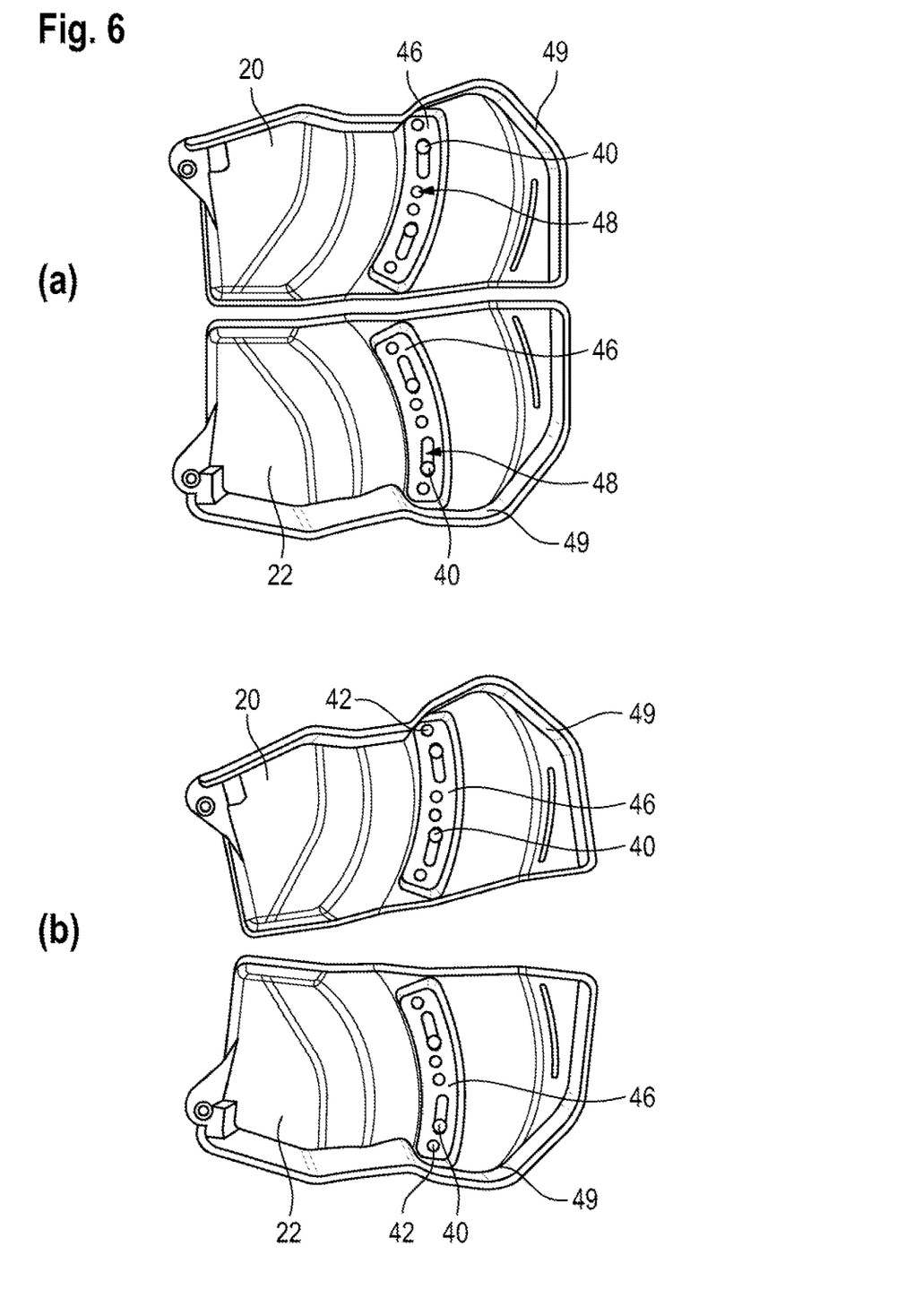
FIGS. 6a and 6b show a diagrammatic view from below of two pivoting sections of the seat assembly from FIG. 2 in the first position and in the second position, respectively.

As can be seen particularly clearly in FIGS. 4 and 6, the two pivoting sections 20, 22 in each case have a plurality of through openings 42 which are arranged along a circular section about the respective pivot pin 32 and 36. Furthermore, as indicated in FIG. 5, the base section 18 has a plurality of receptacles 44.

In the exemplary embodiment which is shown in FIGS. 3 to 6, in each case two fastening means 40 are provided for the first pivoting section 20 and for the second pivoting section 22. Any other desired number of fastening means 40 can also be provided, however.

The fastening means 40 extend through in each case one of the through openings 42 into one of the receptacles 44. Here, in relation to their radial direction, the through openings 42 and the receptacles 44 are preferably in each case of substantially complementary configuration with respect to the fastening means 40, with the result that the pivoting movements of the first pivoting section 20 and of the second pivoting section 22 are prevented by way of a positively locking connection.

The fastening means 40 can be configured as screws, the receptacles 44 preferably having an internal thread which matches the thread of the screws, with the result that the pivoting sections 20, 22 can be screwed fixedly on the base section 18 through the through openings 42.

As shown in FIG. 5, the receptacles 44 can also as an alternative be configured as through openings, the fastening means 40 which are configured as screws being fastened by means of nuts 45 which are provided on the underside of the base section 18.

At least one reinforcing element 46 can optionally be provided on each of the pivoting sections 20, 22, which reinforcing element 46 is arranged directly on an upper side and/or on an underside of the corresponding pivoting section 20, 22. The at least one reinforcing element 46 has a plurality of through openings 48, the fastening means 40 of the locking device 38 extending through in each case one of the through openings 48.

The at least one reinforcing element 46 forms a washer for the fastening means 40, in order to distribute the force which is exerted on the pivoting sections 20, 22 by the fastening means 40 to a greater surface area. The at least one reinforcing element preferably consists of metal.

As an alternative or in addition, a reinforcing element 46 can also be provided on the underside of the base section 18.

By way of the above-described adjusting device 28, the pivoting sections 20, 22 can be connected to the base section 18 by means of the fastening means 40 in a stepped manner in a plurality of positions which have pivoting angles which are different than one another with respect to the base section 18. Accordingly, the width of the seat assembly 16 can be adjusted in a plurality of steps.

The fixing device 38, in particular the position of the individual through openings 42 in the pivoting sections 20, 22, defines a minimum and/or a maximum angle of the pivoting movement here. The seat assembly 16 has a minimum width in the case of the minimum angle of the pivoting movement and a maximum width in the case of the maximum angle of the pivoting movement.

The pivoting sections 20, 22 optionally have in each case one lateral wall section 49 which, as viewed in the longitudinal direction of the seat assembly 16, extends laterally past the base section 18 starting from an upper side of the base section 18. Here, a contour of the wall sections 49 is similar in the mathematical sense at least in sections to a contour of the base section 18.

In the non-pivoted position of the pivoting sections 20, 22, the wall sections 49 bear at least in sections on the outer side against the base section 18, in particular along the entire contour of the wall sections 49. The wall sections 49 therefore form a stop which defines the minimum deflection of the pivoting sections 20, 22 with regard to the pivoting movement.

The minimum deflection of the pivoting sections 20, 22 is shown in FIGS. 2, 3, 5a and 6a. The two pivoting sections 20, 22 are not pivoted with respect to one another, and therefore run substantially parallel to one another in the longitudinal direction of the motorcycle 10.

In contrast, FIGS. 4, 5b and 6b in each case show a pivoted position of the two pivoting sections 20, 22, in which pivoted position the two pivoting sections 20, 22 are in each case pivoted toward the outside, as a result of which the width of the seat assembly and therefore the seat face for the rider and possibly for the pillion passenger is broadened.

In the above-described configuration of the seat assembly 16, a possible sequence of the width adjustment of the seat assembly 16 is given by way of the following steps:

First of all, the seat cushion 24 and/or the base section 18 are/is removed. The fastening means 40 are then released, with the result that the pivoting movement of the two pivoting sections 20, 22 is released.

Afterward, the two pivoting sections 20, 22 are pivoted into the desired position, and the fastening means 40 are tightened again, with the result that the pivoting movement of the two pivoting sections 20, 22 is locked again. Subsequently, the seat cushion 24 and/or the base section 18 are/is fastened again.

In order that the material of the seat cushion 24 does not have to stretch excessively in the case of the above-described width adjustment of the seat assembly 16, a longitudinal slot 50 is provided in the seat cushion 24 in the region of the pivoting sections 20, 22. The longitudinal slot 50 preferably runs in the longitudinal direction of the motorcycle 10 over the entire length of the two pivoting sections 20, 22.

As an alternative to the above-described configuration of the pivoting sections 20, 22, the through openings 42 can also be configured as slots. The slots then extend in each case substantially along a circular section about the corresponding pivot pin 32, 36.

In this configuration of the seat assembly 16, the fastening means 40 also extend through the slots into the respective receptacle 44 in the base section 18.

Here, the fastening means 40 preferably have a first and a second position, the respective pivoting section 20, 22 being connected in a non-positive manner to the base section 18 with regard to the pivoting movement in the first position of the fastening means 40, and it being possible for the respective pivoting section 20, 22 to be pivoted with respect to the base section 18 in the second position of the fastening means 40. Accordingly, the width of the seat assembly can be adjusted in an infinitely variable manner in this configuration of the seat assembly 16.

In the embodiments of the seat assembly 16 which have been described up to now, the width of the seat assembly 16 is adjusted by way of manual removal of the seat cushion 24 and/or of the base section 18 and subsequent manual release of the fastening means 40.

The adjusting device 28 can be capable of being actuated, however, electrically and/or mechanically in any desired, suitable way. Accordingly, the adjusting device 28 then comprises an electric motor and/or a mechanical mechanism, by means of which the two pivoting sections 20, 22 can be pivoted. The width adjustment of the seat assembly 16 can take place at least partially automatically and/or manually.

For example, the adjusting device has a worm gear mechanism which is connected to the electric motor and/or the mechanical mechanism and by means of which the two pivoting sections 20, 22 can be adjusted.

Here, for example, the adjusting device 28 can be actuated without it being necessary for parts such as the seat cushion 24 and/or the base section 18 to be removed. For this purpose, the adjusting device 28 can have an actuating element which is accessible from outside the motorcycle 10, such as, for example, an adjusting wheel for actuating the mechanical mechanism and/or an actuating switch for the electric motor.

If the adjusting device 28 has an electric motor, the width adjustment of the seat assembly 16 can also take place while riding.

What is claimed is:

1. An adjustable seat assembly for a motorcycle, comprising:
   a seat pan; and
   an adjusting device,
   wherein
   the seat pan includes a base section and two pivoting sections connected pivotably to the base section,
   the two pivoting sections are arranged on the base section behind, in a longitudinal direction of the seat assembly, a front cushion on the base section,
   the two pivoting sections are arranged laterally next to one another as viewed in the longitudinal direction of the seat assembly,
   the two pivoting sections are connected at their respective front laterally outer ends at pivots on the base section,
   the base section has a fastening section configured for fastening the seat assembly to the motorcycle,
   the adjusting device is configured to pivot the two pivoting sections relative to the base section,
   the two pivoting sections have in each case one outer lateral wall section, as viewed in the longitudinal direction of the seat assembly, each outer lateral wall section extending laterally past the base section starting from an upper side of the base section, and
   a contour of the outer lateral wall sections in each case follows an outer contour of the base section longitudinally between the pivots and the adjusting device.

2. The seat assembly according to claim 1, wherein
the pivoting sections are connected in each case to the base section at their respective front laterally outer ends, as viewed in the longitudinal direction of the seat assembly.

3. The seat assembly according to claim 2, wherein
the pivoting sections are connected to the base section by respective pivot pins.

4. The seat assembly according to claim 1, wherein
the adjusting device includes a locking device configured to release and lock a pivoting movement of the two pivoting sections, and
the locking device defines a minimum and a maximum angle of the pivoting section pivoting movement relative to the longitudinal direction of the seat assembly.

5. The seat assembly according to claim 4, wherein
the base section has at least two receptacles,
the pivoting sections have in each case at least one through opening,
fasteners of the locking device extend through the at least one through opening of each pivoting section into respective ones of the at least two receptacles.

6. The seat assembly according to claim 5, wherein
the through openings are configured in each case as a slot, and
the slots extend in each of the pivoting sections substantially along a circular section about a center of the pivoting movement of each of the pivoting sections.

7. The seat assembly according to claim 1, wherein
the adjusting device is at least one of electrically and mechanically actuatable.

8. The seat assembly according to claim 1, wherein
the pivoting sections have in each case one lateral wall section, as viewed in the longitudinal direction of the seat assembly, lateral wall section extending in each case laterally past the base section starting from an upper side of the base section,
and a contour of the wall sections in each case at least in sections following a contour of the base section.

9. The seat assembly according to claim 1, wherein
the seat assembly has a seat cushion extending substantially over the entire base section and is connected to at least one of the pivoting sections and the base section.

10. The seat assembly according to claim 9, wherein
the seat cushion has a longitudinal slot in the region of the two pivoting sections.

11. The seat assembly according to claim 10, wherein at least one of the seat cushion and the base section is removable.

12. The seat assembly according to claim 9, wherein at least one of the seat cushion and the base section is removable.

13. A motorcycle, comprising:
an adjustable seat assembly for a motorcycle having a seat pan and an adjusting device, wherein
   the seat pan includes a base section and two pivoting sections connected pivotably to the base section,
   the two pivoting sections are arranged on the base section behind, in a longitudinal direction of the seat assembly, a front cushion on the base section,
   the two pivoting sections are arranged laterally next to one another as viewed in the longitudinal direction of the seat assembly,
   the two pivoting sections are connected at their respective front laterally outer ends at pivots on the base section,
   the base section has a fastening section configured for fastening the seat assembly to the motorcycle,
   the adjusting device is configured to pivot the two pivoting sections relative to the base section,
   the two pivoting sections have in each case one outer lateral wall section, as viewed in the longitudinal direction of the seat assembly, each outer lateral wall section extending laterally past the base section starting from an upper side of the base section,
   a contour of the outer lateral wall sections in each case follows an outer contour of the base section longitudinally between the pivots and the adjusting device, and
   the base section is connected fixedly to the motorcycle.

\* \* \* \* \*